Patented Nov. 9, 1943

2,333,633

UNITED STATES PATENT OFFICE 2,333,633

POLYMERIZATION METHOD

Edgar C. Britton and Walter J. Le Fevre, Midland, Mich., assignors to The Dow Chemical Company, Midland, Mich., a corporation of Michigan No Drawing. Application August 3, 1940, Serial No. 351,223

13 Claims. (Cl. 260—83)

This invention concerns an improved method of polymerizing certain unsaturated organic compounds.

A co-pending application of J. W. Britton and R. C. Dosser, Serial No. 351,220, filed August 3, 1940, describes certain new complex catalysts for the polymerization of unsaturated organic compounds and also a method of polymerizing vinyl halides in the presence of the catalysts. The complex catalysts are mixtures comprising an acid, a peroxide and a ferric compound. In the co-pending application it is shown that such mixture is far more effective than any of its ingredients in promoting the polymerization of vinyl compounds, but it is pointed out that, in order to obtain best results when using the complex catalysts, other polymerizing conditions must be varied to suit the particular vinyl compound under treatment. Said co-pending application acknowledges that the present applicants have invented improved methods of employing the complex catalysts for the polymerization of certain unsaturated organic compounds.

In our studies of the above-mentioned complex catalysts, we have found that, although they are exceptionally effective in promoting the polymerization of a wide variety of polymerizable organic compounds, the effectiveness of the catalysts is largely dependent upon the particular combination of polymerizable compound and reaction medium employed, i. e. a medium best suited to polymerization of a given unsaturated organic compound with the catalyst frequently interferes with the polymerization of a different unsaturated organic compound with the same catalyst. For instance, in polymerizing vinyl cyanide with such complex catalyst we have found that the catalytic polymerization occurs rapidly when aqueous methanol is used as a medium, but that it takes place sluggishly if carried out in aqueous emulsion. In contrast, the polymerization of vinylidene chloride, i. e. assym.-dichloro-ethylene, with the complex catalyst occurs rapidly if carried out in aqueous emulsion, but only sluggishly if attempted in aqueous methanol solution. The cause of this phenomenon is not known.

We have further found that, when using the new complex catalysts for the polymerization of unsaturated organic compounds having the general formula,

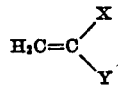

wherein X represents hydrogen, halogen or an alkyl substituent and Y represents a halogen, an alkyl-carbonyl, an alkoxy-carbonyl or an acyloxy substituent, and the compound contains halogen only when X and Y both represent halogen, the polymerization takes place most rapidly and completely if carried out in aqueous emulsion. As hereinbefore stated, such is not the case when using the same catalyst for the polymerization of other polymerizable unsaturated organic compounds.

Examples of the unsaturated organic compounds having the above general formula which may advantageously be polymerized in aqueous emulsion using the new complex catalysts are vinylidene chloride, vinylidene bromide, vinylidene chloro-bromide, methyl acrylate, ethyl acrylate, methyl methacrylate, ethyl methacrylate, methyl alpha-ethyl acrylate, methyl vinyl ketone, ethyl vinyl ketone, methyl alpha-methyl-vinyl ketone, vinyl acetate, vinyl propionate, etc.

As hereinbefore indicated, the complex catalysts employed to promote the polymerization comprise as their essential ingredients an acid, a per-oxygen compound capable of supplying nascent oxygen in the reaction mixture, and a ferric compound. The kinds and the proportions of acid, per-oxygen compound and ferric compound employed as catalyst ingredients may be varied widely. Any water-soluble acid of strength sufficient to render the emulsified reaction mixture definitely acidic may be used as the acid ingredient. Examples of such acids are nitric acid, hydrochloric acid, sulphuric acid, benzene sulphonic acid, acetic acid, chloroacetic acid, etc. The acid is employed in amount sufficient to reduce the pH value of the emulsion to below 6, and preferably to between 1.5 and 3. Best results are usually obtained when employing nitric acid in the proportions just stated as the acid ingredient of the catalyst, although in polymerizing readily hydrolyzable organic compounds, e. g. vinyl acetate or other vinyl ester, a weaker acid such as acetic acid is preferably used so as to avoid possible hydrolysis.

Any peroxide which is soluble in, or readily emulsifiable with, water may be used as a catalyst ingredient, but hydrogen peroxide is preferred. Other per-oxygen compounds which may be used are benzoyl peroxide, sodium or potassium perborate, peracetic acid, and metal peroxides such as sodium or barium peroxide, which may be reacted with the acid to form hydrogen peroxide in situ. Between 0.002 and 0.2 mole of the per-oxygen compound is usually employed per mole of the organic compound to be polymerized, but it may be used in other proportions if desired.

Examples of ferric compounds which may be employed as catalyst ingredients are ferric nitrate, ferric chloride, ferric sulphate, ferric acetate, ferric salts of sulphonic acids such as benzene sulphonic acid, toluene sulphonic acid, sulphonated sperm oil, etc. Apparently any ferric compound which is soluble or emulsifiable with water may be employed. The proportion of ferric compound is preferably very small, between 0.0001 and 0.05 per cent by weight of iron relative to the vinyl compound usually being employed, although smaller or somewhat larger proportions may be used.

It will be noted from the foregoing statements that the proportions of the several catalyst ingredients with respect to one another may be varied over wide ranges. However, we usually employ the ferric compound and the peroxide in relative proportions corresponding to between about 0.000001 and 0.0004 gram atom of iron per mole of the peroxide. As hereinbefore stated, the acid is advantageously used in amount sufficient to lower the pH value of the reaction mixture to below 6 and preferably to between 1.5 and 3.

In preparing the emulsified reaction mixture, the polymerizable organic compound and the essential catalyst ingredients in the proportions hereinbefore stated are mixed in any desired order with water and an emulsifying agent and the mixture is agitated to effect emulsification. The identity of the emulsifying agent is of secondary importance provided, of course, that it is one forming stable emulsions with the acidic mixture required by the invention. A number of emulsifying agents having the property of forming stable emulsions of organic compounds with dilute aqueous acids are known. Among the various emulsifying agents which may be used are egg albumen and alkali metal sulphonates of aliphatic or alkyl-aromatic hydrocarbons of high molecular weight. Nopco (a sodium salt of sulphonated sperm oil) is particularly well adapted to use as the emulsifying agent. The proportion of emulsifying agent required is usually small, e. g. Nopco, when used, is preferably employed in amount corresponding to between 0.1 and 2.5 per cent of the weight of the water.

The emulsion is brought to a temperature sufficient to cause rapid polymerization of the unsaturated organic compound, the preferred temperature being dependent upon the particular polymerizable compound under treatment. In most instances the polymerization occurs rapidly and smoothly at temperatures between 20° and 100° C., and in some instances it may be carried out rapidly at temperatures as low as −10° C. It may, of course, be carried out at temperatures up to the decomposition point of the product, e. g. at 150° C. or higher. Air is preferably excluded during the polymerization, e. g. by carrying the reaction out in a closed container or in contact with nitrogen, carbon dioxide, or other inert gas, since molecular oxygen, if absorbed in large quantity, may cause discoloration of the product. The polymerization may usually be completed within 10 hours and in some instances may be carried to completion within one hour. The mixture is preferably agitated during the polymerization.

After completing the polymerization, the emulsion is broken in any of the usual ways, e. g. by heating the same or by adding methyl alcohol, ethyl alcohol, propyl alcohol, acetone, ammonia, or by adding salts such as sodium chloride, calcium chloride, etc., whereby the polymer or copolymer is precipitated, usually as a powder. The precipitate is separated, washed free of adhering mother liquor, and dried. The yield of polymer from the method just described is usually high; in some instances quantitative.

The following examples describe a number of ways in which the principle of the invention has been applied, but they are not to be construed as limiting the invention.

EXAMPLE 1

Each of a number of polymerizable organic compounds was emulsified with water as follows: 25 parts by weight of the polymerizable compound, 75.5 parts of a dilute aqueous hydrogen peroxide solution (containing 75 parts of water and 0.5 part of hydrogen peroxide) and 2.5 parts of Nopco (a sodium salt of sulphonated sperm oil) were mixed and the mixture was agitated until emulsified. The emulsion was divided into 3 portions and one portion was treated with an acid in amount sufficient to reduce its pH value to 2, and another portion was treated with a like proportion of the acid and also with ferric chloride in amount corresponding to 0.004 per cent of the weight of the mixture. The three samples of the emulsion were then maintained at a temperature of 40° C. in closed containers for the time stated in the following table, after which each sample was treated with methanol to precipitate the polymer and the yield of polymer was determined. The following table names the polymerizable organic compound subjected to each test, states which of the catalyst ingredients, hydrogen peroxide, acid, and ferric chloride was present in the emulsion subjected to warming, gives the time over which each emulsion was maintained at 40° C., and gives the per cent yield of polymer, based on the amount of polymerizable organic compound employed.

Table I

| Run No. | Polymerizable compound | Catalyst ingredients | Time, hours | Polymer per cent yield |
|---|---|---|---|---|
| 1 | Asym.-dichloro-ethylene | $H_2O_2$ | 6.75 | None |
| 2 | ---do--- | $H_2O_2 + HNO_3$ | 6.75 | 10.6 |
| 3 | ---do--- | $H_2O_2 + HNO_3 + FeCl_3$ | 6.75 | 40.0 |
| 4 | Vinyl acetate | $H_2O_2$ | 10 | 13.2 |
| 5 | ---do--- | $H_2O_2 +$ acetic acid | 10 | Trace |
| 6 | ---do--- | $H_2O_2 +$ acetic acid $+ FeCl_3$ | 10 | 28.2 |
| 7 | Methyl methacrylate | $H_2O_2$ | 7 | None |
| 8 | ---do--- | $H_2O_2 + HNO_3$ | 7 | None |
| 9 | ---do--- | $H_2O_2 + HNO_3 + FeCl_3$ | 7 | 39.7 |
| 10 | Methylene-methyl ethyl ketone | $H_2O_2$ | 13.75 | Trace |
| 11 | ---do--- | $H_2O_2 + HNO_3$ | 14.5 | 2.2 |
| 12 | ---do--- | $H_2O_2 + HNO_3 + FeCl_3$ | 14.5 | 6.8 |

From the data in Table I it will be seen that the catalytic mixtures of peroxide, acid and ferric compound were far more active than either the peroxide alone or the mixtures of peroxide and acid in promoting the polymerization.

EXAMPLE 2

An emulsion of vinyl acetate, which emulsion contained hydrogen peroxide, acetic acid and ferric chloride and had the same composition as that employed in run 6 of Table I, was prepared as in Example 1. The emulsion was heated in a closed container at a temperature of 50° C. for 20 hours, after which it was treated with methanol to precipitate the polymer. The latter was separated from the mixture, washed with water, dried and weighted. The yield of solid polymerized vinyl acetate was quantitative.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of polymerizing an unsaturated organic compound having the general formula,

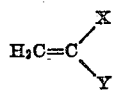

wherein X represents a substituent selected from the group consisting of hydrogen, halogen and alkyl substituents and Y represents a substituent selected from the group consisting of halogen, alkyl-carbonyl, alkoxy-carbonyl, and alkyl-carbonyl-oxy substituents, and the unsaturated organic compound contains halogen only when X and Y both represent halogen, the steps of forming an aqueous emulsion of the unsaturated organic compound, which emulsion also contains, as ingredients of the emulsion, small proportions of a water-soluble acid, a per-oxygen compound, and a ferric compound, and polymerizing the unsaturated organic compound while in said emulsion.

2. In a method for polymerizing an unsaturated organic compound having the general formula,

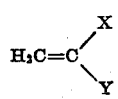

wherein X represents a substituent selected from the group consisting of hydrogen, halogen and alkyl substituents and Y represents a substituent selected from the group consisting of halogen, alkyl-carbonyl and alkoxy-carbonyl and alkyl-carbonyl-oxy substituents, and the unsaturated organic compound contains halogen only when X and Y both represent halogen, the steps of forming an aqueous emulsion of said unsaturated organic compound, which emulsion contains, as ingredients thereof, a water-soluble acid in amount sufficient to reduce the pH value of the emulsion to below 6, a ferric compound in amount such that its iron content corresponds to between 0.0001 and 0.05 per cent of the weight of the unsaturated organic compound, and between 0.002 and 0.2 mole of a peroxide per mole of the unsaturated organic compound, and polymerizing the unsaturated organic compound while in said emulsion.

3. In a method for polymerizing an unsaturated organic compound having the general formula,

wherein X represents a substituent selected from the group consisting of hydrogen, halogen and alkyl substituents and Y represents a substituent selected from the group consisting of halogen, alkyl-carbonyl and alkoxy-carbonyl and alkyl-carbonyl-oxy substituents, and the unsaturated organic compound contains halogen only when X and Y both represent halogen, the steps of forming an aqueous emulsion of said unsaturated organic compound, which emulsion contains, as ingredients thereof, a water-soluble acid in amount sufficient to reduce the pH value of the emulsion to between 1.5 and 3, a ferric compound in amount such that its iron content corresponds to between 0.0001 and 0.05 per cent of the weight of the unsaturated organic compound, and between 0.002 and 0.2 mole of hydrogen peroxide per mole of the unsaturated organic compound, polymerizing the unsaturated organic compound while in said emulsion, and thereafter precipitating and separating the polymer.

4. In a method for polymerizing an unsaturated organic compound having the general formula,

wherein X represents a substituent selected from the group consisting of hydrogen, halogen and alkyl substituents and Y represents a substituent selected from the group consisting of halogen, alkyl-carbonyl and alkoxy-carbonyl and alkyl-carbonyl-oxy substituents, and the unsaturated organic compound contains halogen only when X and Y both represent halogen, the steps of forming an aqueous emulsion of said unsaturated organic compound, which emulsion contains, as ingredients of the emulsion, nitric acid in amount sufficient to reduce the pH value of the emulsion to between 1.5 and 3, a ferric compound in amount such that its iron content corresponds to between 0.0001 and 0.05 per cent of the weight of the unsaturated organic compound, between 0.002 and 0.2 mole of hydrogen peroxide per mole of the unsaturated organic compound, and an emulsifying agent, polymerizing the unsaturated organic compound while in said emulsion, and thereafter precipitating and separating the polymer from the mixture.

5. In a method for polymerizing methyl methacrylate, the steps of forming an aqueous emulsion containing, as ingredients of the emulsion, the methyl methacrylate and minor proportions of an emulsifying agent, a water-soluble acid, a peroxide, and a ferric compound, and polymerizing the methyl methacrylate while in said emulsion.

6. In a method for polymerizing methyl methacrylate, the steps of forming an aqueous emulsion containing, as ingredients of the emulsion, the methyl methacrylate, an emulsifying agent, a water-soluble acid in amount sufficient to reduce the pH value of the emulsion to below 6, a ferric compound in amount such that its iron content corresponds to between 0.0001 and 0.05 per cent of the weight of the methyl methacrylate, and between 0.002 and 0.2 mole of peroxide per mole of the methyl methacrylate, and polymerizing the latter while in said emulsion.

7. In a method for polymerizing methyl methacrylate, the steps of forming an aqueous emulsion containing, as ingredients of the emulsion, the methyl methacrylate, an emulsifying agent, nitric acid in amount sufficient to reduce the pH value of the emulsion to between 1.5 and 3, a ferric compound in amount such that its iron content corresponds to between 0.0001 and 0.05 per cent of the weight of the methyl methacrylate, and between 0.002 and 0.2 mole of hydrogen peroxide per mole of the methyl methacrylate, polymerizing the latter while in said emulsion, and thereafter precipitating and separating the polymer from the mixture.

8. In a method for polymerizing a vinylidene halide, the steps of forming an aqueous emulsion containing, as ingredients of the emulsion, the vinylidene halide and minor proportions of an emulsifying agent, a water-soluble acid, a peroxide, and a ferric compound, and polymerizing the vinylidene halide while in said emulsion.

9. In a method for polymerizing vinylidene chloride, the steps of forming an aqueous emulsion containing, as ingredients of the emulsion, the vinylidene chloride, an emulsifying agent, a water-soluble acid in amount sufficient to reduce the pH value of the emulsion to below 6, a ferric compound in amount such that its iron content corresponds to between 0.0001 and 0.05 per cent of the weight of the vinylidene chloride, and between 0.002 and 0.2 mole of peroxide per mole of the vinylidene chloride, and polymerizing the latter while in said emulsion.

10. In a method for polymerizing vinylidene chloride, the steps of forming an aqueous emulsion containing, as ingredients of the emulsion, the vinylidene chloride, an emulsifying agent, nitric acid in amount sufficient to reduce the pH value of the emulsion to between 1.5 and 3, a ferric compound in amount such that its iron content corresponds to between 0.0001 and 0.05 per cent of the weight of the vinylidene chloride, and between 0.002 and 0.2 mole of hydrogen peroxide per mole of the vinylidene chloride, polymerizing the latter while in said emulsion and thereafter precipitating and separating the polymer from the mixture.

11. In a method for polymerizing a vinyl ester of an aliphatic carboxylic acid, the steps of forming an aqueous emulsion containing, as ingredients of the emulsion, said vinyl ester and minor proportions of an emulsifying agent, a water-soluble acid, a peroxide, and a ferric compound, and polymerizing the vinyl ester while in said emulsion.

12. In a method for polymerizing vinyl acetate, the steps of forming an aqueous emulsion containing, as ingredients of the emulsion, the vinyl acetate, an emulsifying agent, a water-soluble acid in amount sufficient to reduce the pH value of the emulsion to below 6, a ferric compound in amount such that its iron content corresponds to between 0.0001 and 0.05 per cent of the weight of the vinyl acetate, and between 0.002 and 0.2 mole of hydrogen peroxide per mole of the vinyl acetate, and polymerizing the latter while in said emulsion.

13. In a method for polymerizing vinyl acetate, the steps of forming an aqueous emulsion containing, as ingredients of the emulsion, the vinyl acetate, an emulsifying agent, acetic acid in amount sufficient to reduce the pH value of the emulsion to between 1.5 and 3, a ferric compound in amount such that its iron content corresponds to between 0.0001 and 0.05 per cent of the weight of the vinyl acetate, and between 0.002 and 0.2 mole of hydrogen peroxide per mole of the vinyl acetate, polymerizing the latter while in said emulsion, and thereafter precipitating and separating the polymer from the mixture.

EDGAR C. BRITTON.
WALTER J. Le FEVRE.